United States Patent
Albers (10) Patent No.: US 8,286,593 B2
(45) Date of Patent: Oct. 16, 2012

(54) ANIMAL COLLAR FOR LIMITING HEAD MOVEMENT

(76) Inventor: Thomas Albers, Kent, OH (US)

( * ) Notice: Subject to any disclaimer, the term of this patent is extended or adjusted under 35 U.S.C. 154(b) by 1031 days.

(21) Appl. No.: 11/545,361

(22) Filed: Oct. 10, 2006

(65) Prior Publication Data
US 2007/0079767 A1     Apr. 12, 2007

Related U.S. Application Data

(60) Provisional application No. 60/725,529, filed on Oct. 12, 2005.

(51) Int. Cl.
    A01K 15/04 (2006.01)
(52) U.S. Cl. .......................................... 119/815
(58) Field of Classification Search .................. 119/856, 119/857, 814, 815; 602/18
    See application file for complete search history.

(56) References Cited

U.S. PATENT DOCUMENTS

| | | | |
|---|---|---|---|
| 3,164,151 A * | 1/1965 | Vere | 602/18 |
| 3,320,950 A * | 5/1967 | McElvenny | 602/18 |
| 4,413,619 A * | 11/1983 | Garth | 602/18 |
| 4,476,814 A | 10/1984 | Miller | |
| 5,133,295 A | 7/1992 | Lippincott | |
| 5,628,283 A * | 5/1997 | Huegelmeyer | 119/815 |
| D418,636 S | 1/2000 | Marconi, Jr. | |
| 6,044,802 A | 4/2000 | Schmid et al. | |
| 6,129,054 A | 10/2000 | Campbell | |
| 6,165,146 A * | 12/2000 | Giebeler | 602/18 |
| 6,244,222 B1 | 6/2001 | Bowen | |
| 6,458,090 B1 * | 10/2002 | Walpin | 602/18 |
| 2003/0037735 A1 | 2/2003 | Albers et al. | |
| 2004/0267178 A1 * | 12/2004 | Benckendorff | 602/18 |

* cited by examiner

Primary Examiner — Kristen C Hayes
(74) Attorney, Agent, or Firm — Hudak, Shunk & Farine Co. LPA (57) ABSTRACT

A restraint for an animal in the form of a collar that is capable of closely conforming to the skeletal structure of the animal at a number of different locations in order to limit physical movement of the head of the animal. The restraint collar includes a body having an upper member adapted to be situated below a jaw of the animal in a region of an upper portion of the animal's neck, and a lower member adapted to be situated in a region of a lower portion of the animal's neck. The body upper member includes a jaw guide located between two upper member crests and having a portion extending downwardly and below the crest towards the lower member. It is adapted to be situated at a central area of the animal's neck. The crests are adapted to fit below the sides of the animal's jaw to provide for a desired restraint.

15 Claims, 5 Drawing Sheets

ANIMAL COLLAR FOR LIMITING HEAD MOVEMENT

CROSS-REFERENCE

This application claims the benefit of priority under 35 U.S.C. §119 of U.S. Provisional Application Ser. No. 60/725,529 filed on Oct. 12, 2005.

FIELD OF THE INVENTION

The present invention relates to a cervical restraint for an animal in the form of a collar that is capable of closely conforming to the skeletal structure of the animal at a number of different locations in order to limit physical movement of the head of the animal.

BACKGROUND OF THE INVENTION

Animals such as dogs and cats occasionally must be restrained in order to limit the ability of the animal to access parts of its body for purposes including licking body parts, such as wounds; biting at stitches; tearing off bandages; or removing intravenous lines. Animal restraint collars can be utilized by veterinarians to assist in examination and by groomers during animal care or grooming.

One commonly utilized animal restraint collar is an "Elizabethan" collar that includes a conical shaped structure radiating out from a narrow open end secured to the neck of an animal behind the head, and extending to a broader open end that extends forwardly about the animal's head to near the snout. Elizabethan type collars are believed to be relatively uncomfortable for an animal because they are relatively bulky and awkward for the animal to wear. Still another type of collar that has been utilized to restrain an animal is often times referred to as a "bite-not-collar" which is comprised of a high-necked collar that can prevent an animal from turning its head to bite. Such collars may be uncomfortable for the animal and require to be stocked in different lengths to accommodate the various neck lengths of different animals.

Examples of other prior art devices include U.S. Pat. No. 4,476,814 to Miller relates to an animal pet medical collar which comprises a self-supporting solid resilient foam body having a doughnut shape formed by a peripheral, generally annular wall defining a central opening adapted to fit around the neck of an animal pet. The wall is reportedly wide enough to prevent a pet wearing it from mouthing a part of the pet's body and thus injuring itself by pulling stitches, licking wounds, etc. The body wall has a pair of spaced opposite ends bridged by a drawstring anchored to one of the ends and passing through the other end to the outside of the body, against which it is releasably locked by a spring clamp or the like. The clamp can be a pair of spring-biased tubes with alignable transverse, drawstring-receiving openings. The drawstring can include a spring or be formed of stretchable material. The drawstring can also include an alarm actuable by excess drawstring tension. The collar can further include recessed drawstring detents in a concealed compartment and a cover which bridges the body gap.

U.S. Pat. No. 6,244,222 to Bowen relates to an adjustable pet collar comprised of a flexible UV safe foam shaped as a cylinder with a vertical slit. The closure consists of one or more self-adhesive loop strap attached around the center of the collar with one end overlapping. The hook strap is attached to the overlapping side of the self-adhesive side loop strap. The collar may contain one or two Velcro strips attached to the collar. A single Velcro strap is used for smaller-animals while the double strap is used for large animals.

U.S. Pat. No. 6,129,054 to Campbell relates to a pad designed to form a collar for supporting the neck of an animal. The pad is formed from a resilient, trimmable, and washable material having a top surface and a bottom surface separated by a pad thickness t. The pad is preferably substantially rectangular, having a pair of free ends which embrace the mandible and scapula of the animal, and a pair of engaging ends which overlap. The pad has a pad length $L_p$ between the engaging ends, and a pad width $W_p$ between the free ends. Preferably, the ratio of $L_p/W_p$ is such that $3<L_p/W_p<6$. The pad is preferably fabricated from a closed-cell polymer foam, and the top and bottom surfaces preferably form soil-resistant layers. Cross-linked polyethylene foam having a density of between about 2 and 6 lbs/cu.ft. with the thickness t being about ¼ inch has been found effective. To form a collar, one or more inelastic bands secure the pad about the neck. Each band is preferably a length of surgical adhesive tape, and is preferably of sufficient length to overlap itself when wrapped around the pad.

U.S. Pat. No. 5,133,295 to Lippincoft relates to a veterinary restraint collar for a cat, comprising two side-by-side rings of soft, flexible and non-resilient medical padding material sewn together along their inner margins and having a drawstring passage with a "stretch" gauze drawstring in the passage. The rings have adjacent faces of thin plastic sheet material, and opposite faces of soft absorbent material, and are gathered to form radial pleats. The rings stand out from the neck hole to form a flexible barrier reportedly restricting the animal's ability to reach portions of its body with its mouth.

U.S. Pat. No. 6,044,802 to Schmid et al. relates to a veterinary recovery collar preventing an animal from licking or biting wounds, sores or stitches on its body and scratching its head with its paws. The collar has the shape of a round pillow with a central aperture. A shawl extends into the central aperture and has a drawstring. The collar is placed over the animal's head and is retained in place by drawing, or pulling, the drawstring that is laced through the shawl. The resulting collar creates a substantive barrier, reportedly preventing the animal from reaching its body with its head, or reaching its head with its paws.

U.S. Pat. No. 418,636 to Marconi, Jr. relates to the ornamental design for a pet harness with restrictive access device collar designed to prohibit passage through fences, as shown and described.

U.S. Pub. No. US2003/0037735 to Albers et al. relates to an animal collar system for safely and conveniently limiting physical movement of an animal's head. The animal collar system includes an elongate protective member having a first end and a second end. The protective member has a generally broad cylindrical structure and is preferably comprised of a resilient material such as foam material. A plurality of cutouts preferably extend into an inner section of the protective member for facilitating bending of the protective member. A securing strap is attached to the first end of the protective member and removably securable to the second end.

Although numerous types of animal restraint collars exist, it would be desirable to provide an animal collar for safely limiting physical movement of the head of animal and minimizing the animal's ability to bite itself or a handler, while providing a collar that is easy to utilize and comfortable for an animal to wear.

SUMMARY OF THE INVENTION

In view of the above described animal collars, an animal cervical restraint collar is provided including a flexible, conformable body having an upper member adapted to be situated under the head of animal and encircling a portion thereof; a lower member adapted to be situated on or above the chest of an animal and encircling a portion thereof, and a connector member for connecting lateral ends of the body around the neck of the animal.

In one embodiment, the connector member has a first fastener connected to a first end of the body and a second fastener connected to a second end of the body for securing the collar around the neck of the animal.

Advantageously, the upper member is provided with a jaw guide that is centrally located on the body and includes a recess extending downwardly from upper member crests on both sides of the jaw guide towards the lower member. The jaw guide is preferably archial in shape, preferably "U" shaped, although other configurations can be utilized.

In an optional, but preferable embodiment, the body for this includes an ear guide laterally adjacent the jaw guide on each side thereof that can further serve to aid in positioning the collar on the animal.

Moreover, in one embodiment the collar can be formed as a reversible collar wherein the body can be either a mirror image above and below a lateral line thereof, or can be provided with different forms above and below the lateral line in order to accommodate a wide range of different animals.

That said, it is an object of the present invention to provide an animal collar that can be utilized to restrain or limit physical movement of an animal's head.

A further object is to provide an animal collar that is easy to connect to and remove from an animal.

Yet another object is to provide an animal collar that can be utilized on animals such as dogs, cats and horses and as such is able to fit animal necks having various lengths and circumferences and can even be used on cats and short-nosed dogs such as pugs.

A further object of the invention is to provide an economical animal collar that is relatively inexpensive to produce.

Another object is to produce an animal collar that is relatively comfortable for an animal to wear such as when compared to a muzzle or Elizabethan collar and therefore does not upset the animal or animal's owner.

Yet a further object of the present invention is to provide an animal collar that is useful for providing examinations, drawing blood samples, providing nail trims, or other grooming, and having the ability to prevent self trauma.

Accordingly, one aspect of the invention is a restraint collar for an animal comprising a body having an upper member adapted to be situated below a jaw of an animal in a region of an upper portion of a neck of the animal and a lower member adapted to be situated in a region of a lower portion of the neck of the animal, the body upper member including a jaw guide located between two upper member crests and having a portion extending downwardly and below the crests toward the lower member adapted to be situated at a front central portion of the animal's neck, the crests adapted to fit below sides of the jaw of the animal, the body having a maximum height between one of the crests and the lower member adapted to make it difficult for the animal to open a mouth thereof, and a connector member having a first fastener connected to a first end of the body and a second fastener connected to a second end of the body for securing the collar around the neck of the animal.

A further aspect of the invention is a restraint collar for animal comprising a resilient, flexible body having an upper member adapted to be situated below a jaw of an animal in a region of an upper portion of a neck of the animal, the body having a lower member adapted to be situated in a region of a lower portion of the neck of animal, the body upper member including a jaw guide having a first end and second end and an archial portion therebetween extending downwardly a distance towards the lower member and adapted to be situated at a front central portion of the animal's neck, the body further including an upper member crest positioned laterally outward on each side of the jaw guide first end and second end.

These and other features, advantages, and objects of the present invention will be further understood and appreciated by those skilled in the art by reference to the following specification, claims, and appended drawings.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 1:
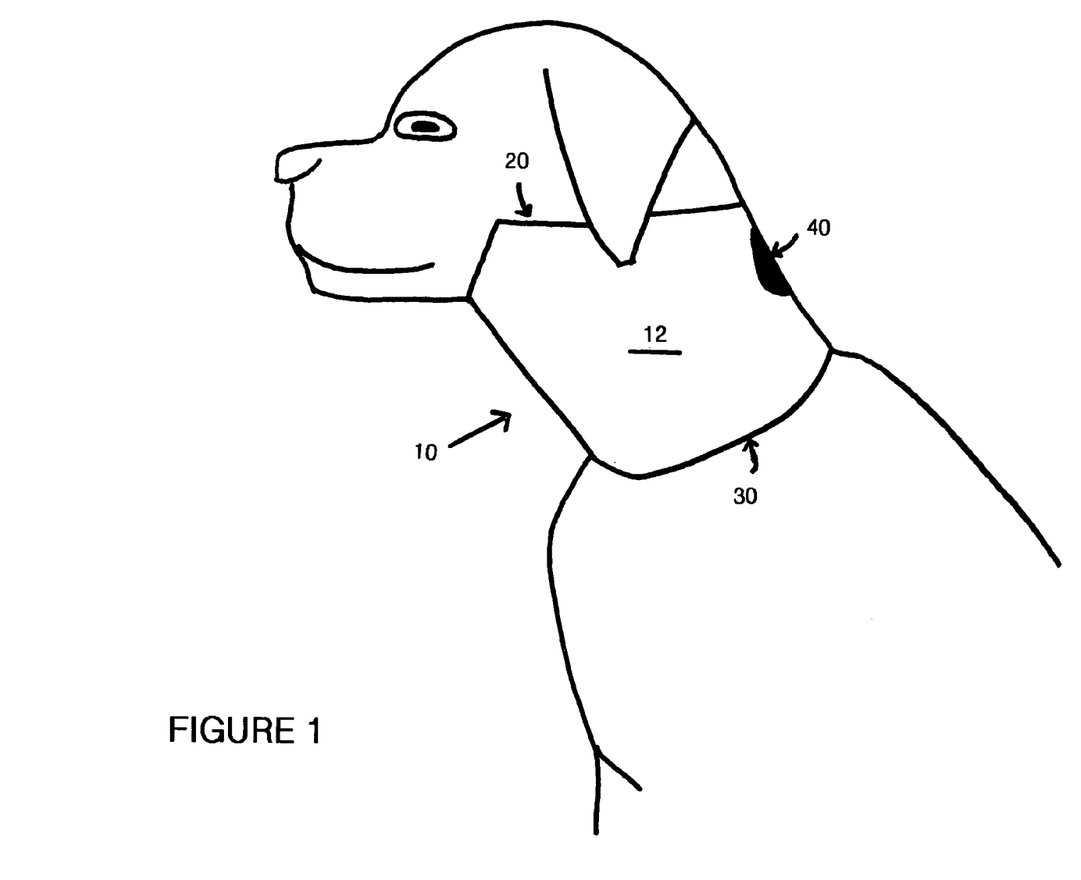
FIG. 1 is an elevational perspective view of one embodiment of the animal collar of the present invention installed around the neck of a dog.

Referring now to the drawings, FIG. 1 illustrates an animal collar 10 of the present invention disposed about the neck of a dog. The collar 10 includes a body 12 adapted to be connected by a connector member 40 about the neck of an animal, such as, but not limited to, a dog, a cat, or a horse. Body 12 includes an upper member 20 adapted to be situated under or below the jaw and head of the animal, and an opposite, lower member 30 adapted to be situated near the chest and shoulders of the animal. The body 12 extends a desired distance around the neck of the animal desirably greater than 70%, and preferably greater than about 95% of the neck circumference of the animal.

Body 12 is preferably formed from a stiff, yet pliable, flexible material such as a polymer, rubber, elastomer, paper or other textile, and most preferably a foamed polymer, rubber or elastomer. The foam can be an open or closed cell foam, with closed cell foam being preferred. Body 12 is resilient and can conform to the particular neck structure of the animal to which the collar is fitted. A preferred body material is closed cell EVA foam available from Chang Wang Industries Co. LTD., Taiwan. Other sources of foamed materials include Pak-Lite Inc. of Suwanee, Ga.

The body 12 has a thickness which can vary depending on the type of animal it is to restrain, as well as the type of material utilized. Thickness is chosen to maintain a desired flexibility and resiliency of the body. That said, maximum thickness of the body ranges generally from about 10 to about 28 millimeters and preferably from 13 to about 15 millimeters.

Figure 2:
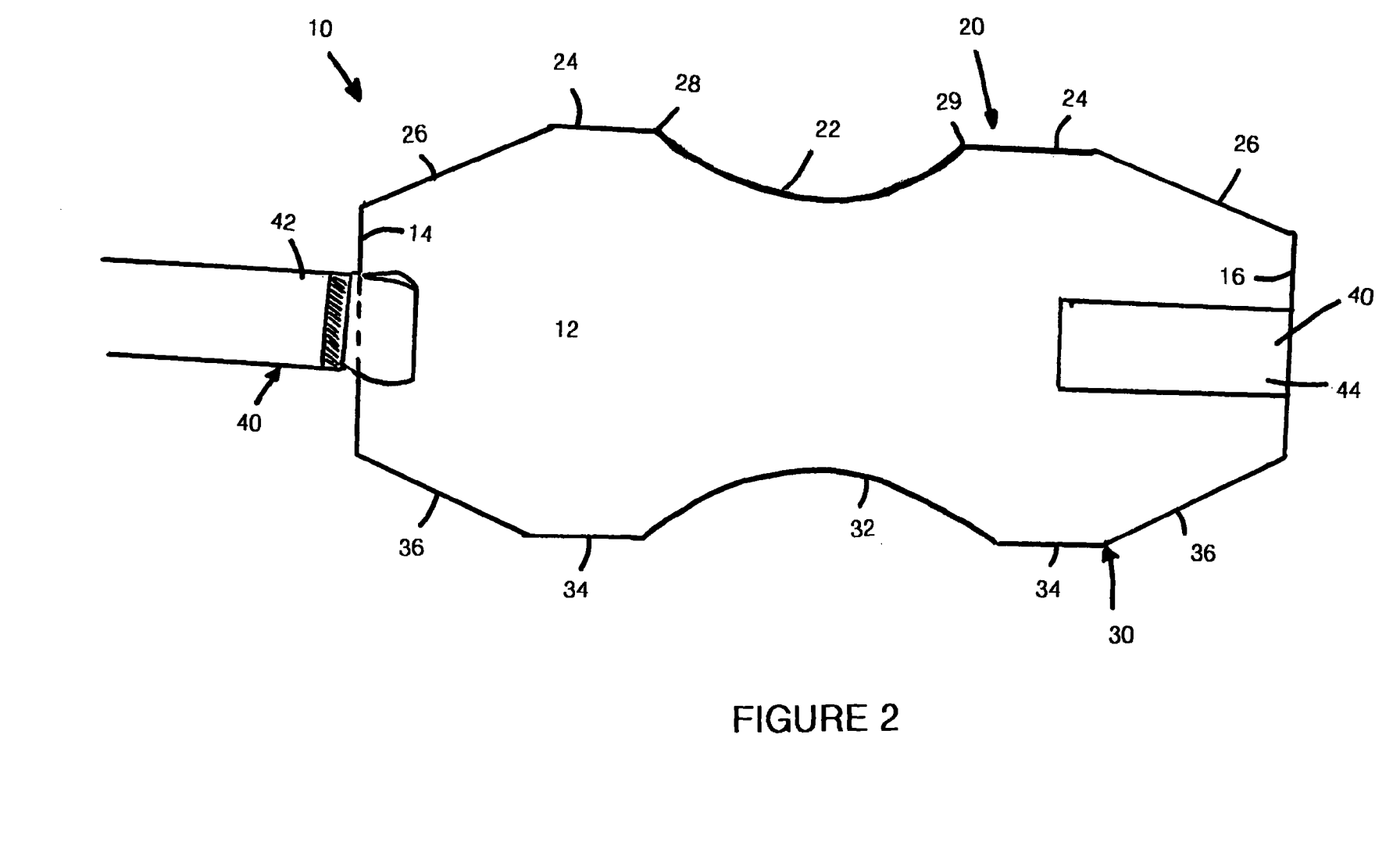
FIG. 2 is a front elevational view of one embodiment of an animal collar of the present invention.

Body 12 is illustrated in a flat, i.e. unbent, position in FIG. 2 to particularly illustrate various features of the invention. Upper member 20 is located along the top end portion of body 12 above lower member 30 that is located along the bottom end portion of body 12. Upper member 20 includes a jaw guide 22 which aids in maintaining the collar in a desired position on the animal during use, and can prevent rotation of the collar. A portion of jaw guide 22 extends below an uppermost end or edge of the body 12 such as an upper crest 24, with jaw guide extending downwardly toward the bottom member 30.

Jaw guide 22 is a cavity or recessed area in body 12 that is adapted to accept a portion of the jaw and/or upper throat area of an animal and accordingly has a shape complimentary thereto. The shape of the jaw guide 22 can vary and can be round, archial, angled, or even square, or a combination thereof. For comfort and adequate restraining ability, the jaw guide 22 preferably is "U" shaped or "V" shaped with the lower-most portion of the jaw guide 22 being substantially centrally located between the ends 28 and 29 of the jaw guide 22.

The maximum depth of the jaw guide 22 from a top end of the upper member 20 can vary based on the size of the animal to be restrained, and ranges generally from about 10 to about 60 millimeters and preferably from about 15 to about 30 millimeters, as measured perpendicular to an imaginary line extending between upper member crests 24 on each side of jaw guide 22. The maximum width of jaw guide 22 between jaw guide ends 28 and 29 ranges generally from about 5 to about 20 centimeters, and preferably from about 10 to about 15 centimeters.

The overall length of body 12 between ends 14 and 16 likewise can vary, and generally depends on the size of the animal the collar is adapted to be utilized in conjunction with. That said, the maximize length of the body ranges generally from about 10 to about 50 centimeters, and preferably from about 20 to about 40 centimeters. The height of body 12 measured between the upper-most portion of upper member 20 and the low-most portion of lower member 30 likewise can vary depending upon the intended use or animal. The maximum height generally ranges from about 5 to about 25 centimeters, and preferably from about 5 to about 17 centimeters.

As indicated hereinabove, the body upper member 20 also includes an upper member crest 24 located on each side of the jaw guide 22. Upper member crest 24 is adapted to be positioned below the jaw of an animal near the ramus of the mandible. Upper member crest 24 also aids in maintaining positioning of the collar at a desired location upon the animal. Upper crest 24 can be a point or an elongated section as desired. As illustrated in FIG. 2 upper crest 24 is an elongated section extending between jaw guide ends 28 and 29 to the respective ear guide sections 26. Crest 24 can be flat, or have any other desired surface undulations, such as a ridge, one or more points, and/or one or more valleys, or the like. At least one area of crest 24 is greater than or equal in height compared to jaw guide ends 28 and 29. In one embodiment crest 24 can include the jaw guide end. The crests 24 help to prevent the animal from lowering its jaw to open its month. The structure of the collar also helps prevent the animal from turning its head from side to side and from flexing its head vertically toward its trunk and extremities.

The outer end of upper crest 24 gives way to or transitions into ear guide 26 in one embodiment. The ear guide 26 is optionally, but preferably included in collar 10 and is adapted to fit under or below the respective ear of the animal about which the collar is placed and further aids of positioning and preventing rotation of the collar 10 on the animal. As illustrated in FIG. 2 ear guide 26 is shown as an angled portion. Alternative embodiments include archial shaped ear guides complimentary in shape to the lower portion of ears of an animal to which the collar 10 is adapted to be connected to.

Figure 3:
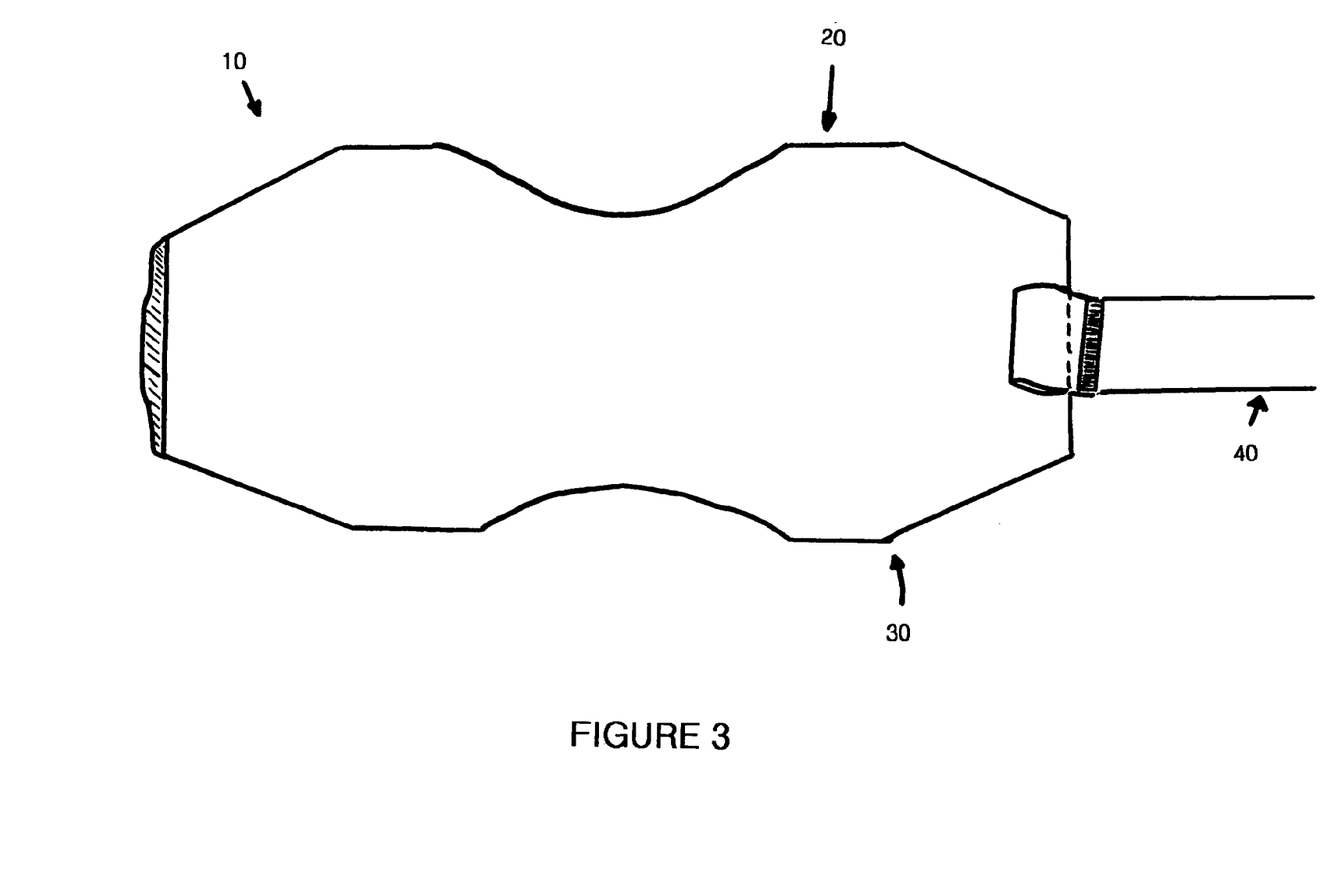
FIG. 3 is a rear elevational view of one embodiment of an animal collar of the present invention.
Figure 4:
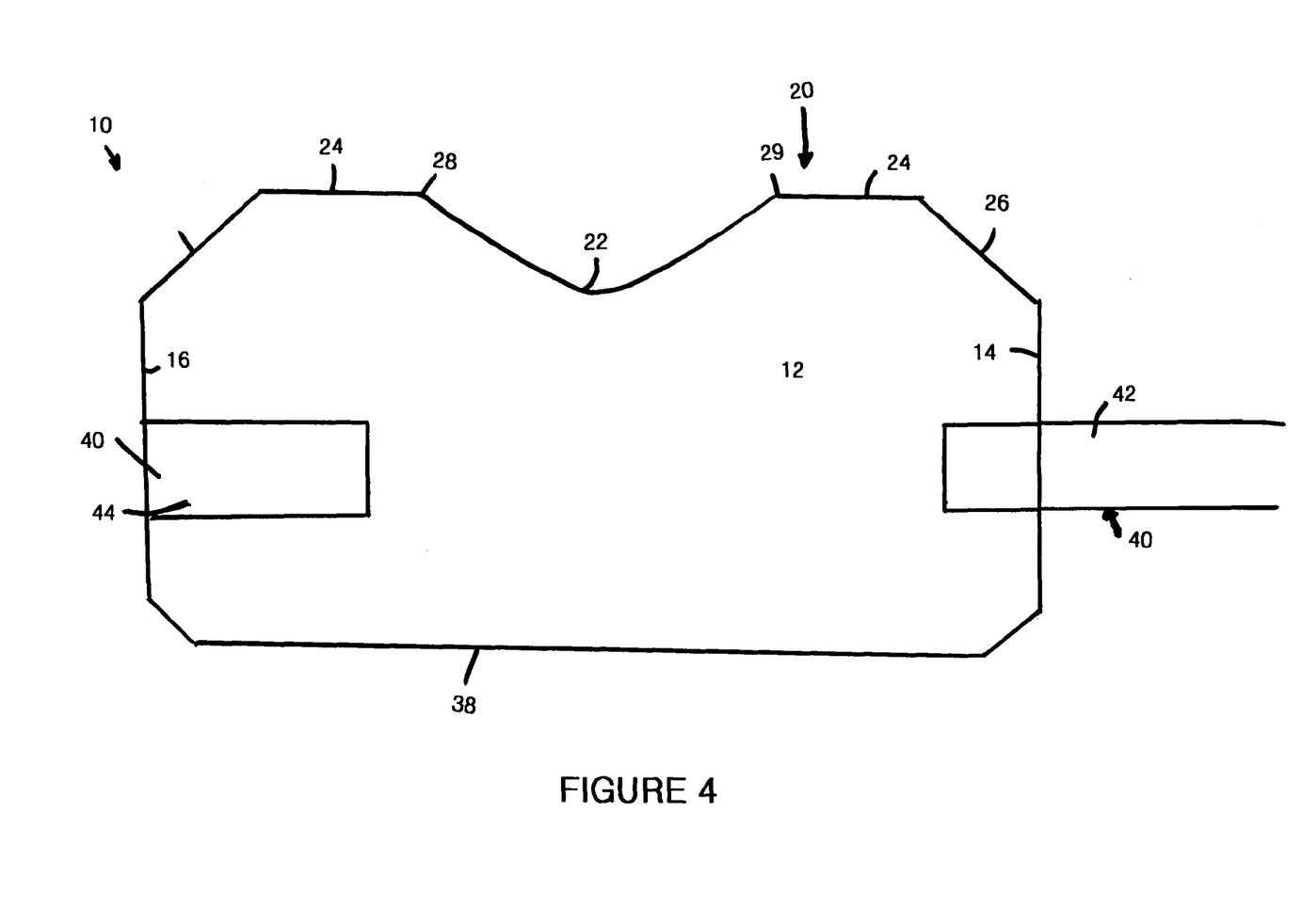
FIG. 4 is a front elevational view of a further embodiment of an animal collar of the present invention.
Figure 5:
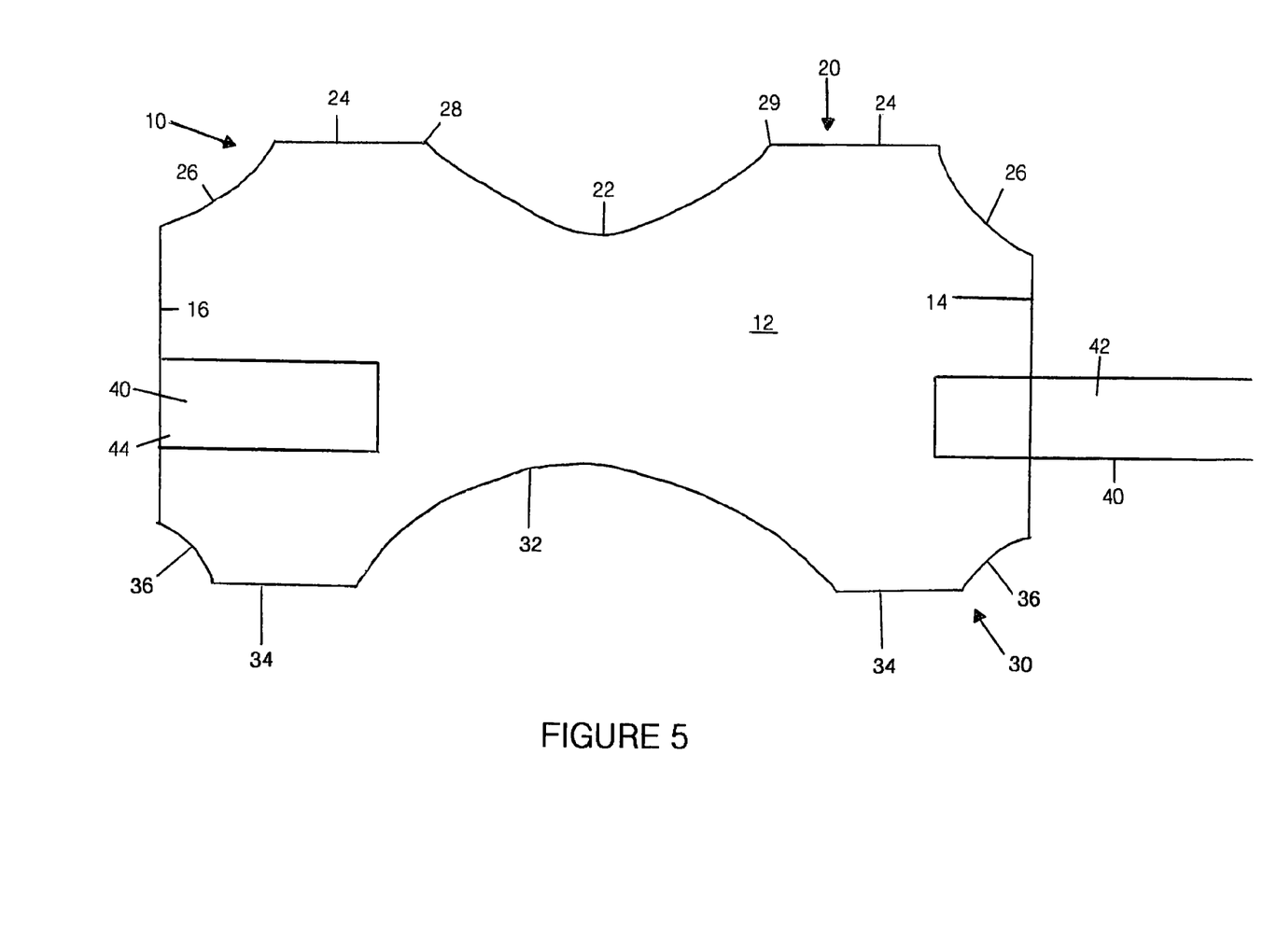
FIG. 5 is a front elevational view of a further embodiment of an animal collar of the present invention.

The collar 10 includes a lower member 30 that is adapted to be situated near the chest or shoulders of the animal and/or along the base of the neck of the animal. The distance between upper member 20 and lower member 30 is sufficient to provide a desired restraint of the animal's head. In the embodiment illustrated in FIG. 2, collar 10 is a reversible collar and is adapted so that the lower member can be reversed and utilized as an upper member as described hereinabove. Accordingly, the lower member 30 is shown including a jaw guide 32 lower member crest 34 and an ear guide 36, as shown in FIG. 2. It is to be understood that the features of the lower member, i.e. jaw guide 32, lower crest 34 and ear guide 36 can be formed having the same or different construction as the features of upper member 20. Obviously, when the features of lower member 30 are different than upper member 20, collar 10 can be utilized on a wider variety of animals. FIG. 4 illustrates lower member 30 having a relatively straight lower end 38 wherein the collar is not a reversible collar. As illustrated in FIGS. 2 through 4 of the drawings, a connector member 40 including a first fastener 42 and a second fastener 44 is connected to the ends or end portions, i.e. first end 14 and second end 16 of body 12 in order to connect to collar 10 around the neck of the animal such as shown in FIG. 1 of the drawings.

The connector member 40 includes a first fastener 42 fastened to first end 14 of the body and a second fastener 44 operatively connected to the second end 16 of body 12. As illustrated in FIGS. 2 through 4, the connector member comprises a hook and loop fastener systems such as VELCRO®. As illustrated, first fastener 42 extends a desired length out from first end 14 and is adapted to be connected to second fastener 44 connected on the surface of body 12 to second end 16. Various other fastener structures are known in the art and can be utilized in place of the hook and loop fasteners illustrated, including fasteners that are not limited to buckles such as a cam buckle or traditional buckle found on a belt with apertures being included in one of the fasteners and an appropriate securing device such as a loop and a pin connected to the second fastener.

In one embodiment of the present invention, first fastener 42 has a first end, containing hook and loop portions on opposite sides thereof, that is placed through an aperture near the lateral end of body 12 and secured thereto to body 12.

Additionally, the second fastener 44 can be connected to the other end portion of the body by an adhesive. Alternatively, the fasteners can be connected to the body by sewing, fastening with metallic or plastic fasteners such as snaps, fabric staples, or the like.

If desired, a cover, not shown, can be utilized to cover body 12 or any portion thereof in order to provide the body with decorative appeal, or protect the body from soiling, or the like. The cover can be comprised of generally any material suitable for covering body 12.

FIG. 3 illustrates a back view of the embodiment shown in FIG. 2 wherein the second fastener 44 is shown attached to the back portion of the body and the first fastener 42 connecting to and extending outwardly from the body 12.

To utilize the collar of the present invention, a user positions the body 12 about the neck of an animal such as shown in FIG. 1 of the drawings. Jaw guide 22 is generally situated near the center portion of the upper neck and below the jaw of the animal. The ends 14 and 16 are bent around the neck of the animal without interfering with the breathing of the animal. The user then secures the connector member 40 by connecting the first fastener 42 to the second fastener 44 in a desired manner so that the collar is maintained in a desired position around the neck of the animal such as shown in FIG. 1. The animal is therefore limited in its ability to move its head while the collar 10 is attached to the neck of the animal. The user can unfasten the connector member 40 when finished with the collar, and body 12 can be removed from the neck of the animal.

Accordingly, the restraint collar of the present invention is designed to prevent various movement of the head of an animal such as a dog, cat, or horse, etc. The structure of the collar can prevent the animal from lowering its jaw to open its mouth, prevent the animal from turning its head from side to side, as well as prevent the animal from biting a person. The jaw guide of the device and associated structure of the crest maintains the collar in a desired position on the animal and keeps the collar from rotating on the pet's neck. The device can be used to help prevent pets from biting people and also to prevent pets from biting or licking at themselves. The device can also be used to deter self mutilation and other behavioral problems. The device can further be utilized to help break horses that want to move their heads sideways or down in order to make sudden moves to throw off the rider of the horse.

While in accordance with the patent statutes the best mode and preferred embodiment have been set forth, the scope of the invention is not limited thereto, but rather by the scope of the attached claims.

What is claimed:

1. A restraint collar for an animal, comprising:
    a body having an upper member adapted to be situated below a jaw of an animal in a region of an upper portion of a neck of the animal and a lower member adapted to be situated in a region of a lower portion of the neck of the animal, the body upper member including a jaw guide located between two upper member crests and having a portion extending downwardly and below the crests toward the lower member adapted to be situated at a front central portion of the animal's neck, the crests adapted to fit below the jaw of the animal, the jaw guide adapted to accept a portion of the jaw or an upper throat area or both the jaw and upper throat area of the animal, the body having a maximum height between one of the crests and the lower member adapted to make it difficult for the animal to open its mouth, and a connector member having a first fastener connected to a first end of the body and a second fastener connected to a second end of the body for securing the collar around the neck of the animal, wherein the body includes an ear guide located on the upper member located laterally outward from each upper member crest and adapted to be situated below the ear of the animal when the collar is in a connected position, and wherein each ear guide independently has an angled portion or an archial portion, wherein the collar is a reversible collar whereby the lower member is utilizable as a second upper member adapted to be situated below the jaw of the animal in the region of the upper portion of the neck of the animal and the upper member as a second lower member adapted to be situated in the region of the lower portion of the neck of the animal when the collar is in a reversed position, wherein the lower member includes a central jaw guide located between two lower member crests and having a portion extending upwardly between the crest toward the upper member, and wherein the lower member includes an ear guide located laterally outward from each lower member crest with the lower ear guide adapted to be situated below the ear of the animal when the collar is in a reversed, connected position, and wherein each lower member ear guide independently has an angled portion or an archial portion, wherein the lower member is formed as a mirror image of the upper member along a lateral line of the body that extends through both lateral ends of the body.

2. The collar according to claim 1, wherein the jaw guide is archial in shape.

3. The collar according to claim 2, wherein the jaw guide is substantially U-shaped between ends of the jaw guide.

4. The collar according to claim 2, wherein the jaw guide has a lower end having a depth that ranges from about 10 to about 60 millimeters measured perpendicular from a line extending between upper ends of the upper member crests.

5. The collar according to claim 4, wherein the body comprises a foamed polymer, rubber, or elastomer or combinations thereof.

6. The collar according to claim 1, wherein the connector member comprises a hook and loop fastening system.

7. The collar according to claim 1, wherein the upper and lower member jaw guides are formed having a different shape.

8. A restraint collar for an animal, comprising:
    a resilient, flexible body having an upper member adapted to be situated below a jaw of an animal in a region of an upper portion of a neck of the animal, the body having a lower member adapted to be situated in a region of a lower portion of the neck of animal, the body upper member including a jaw guide having a first end and second end and an archial portion therebetween extending downwardly a distance towards the lower member and adapted to be situated at a front central portion of the animal's neck, the body further including an upper member crest positioned laterally outward on each side of the jaw guide first end and second end and each adapted to fit below the jaw of the animal, wherein the body includes an ear guide located on the upper member located laterally outward from each upper member crest and adapted to be situated below the ear of the animal when the collar is in a connected position, and wherein each ear guide independently has an angled portion or an archial portion, wherein the collar is a reversible collar whereby the lower member is utilizable as a second upper member adapted to be situated below the jaw of the animal in the region of the upper portion of the neck of the animal and the upper member as a second lower member adapted to be situated in the region of the lower portion of the neck of the animal when the collar is in a reversed position and the upper member as a second lower member when the collar is on the animal in a reversed position, wherein the lower member includes a central jaw guide located between two lower member crests and having a portion extending upwardly between the crest toward the upper member, and wherein the lower member includes an ear guide located laterally outward from each lower member crest with the lower ear guide adapted to be situated below the ear of the animal when the collar is in the reversed, connected position, and wherein each lower member ear guide independently has an angled portion or an archial portion, and wherein the jaw guide is substantially V-shaped between ends of the jaw guide.

9. The collar according to claim 8, wherein the body comprises a polymer, a rubber, an elastomer, paper, textile or combinations thereof, and wherein the jaw guide has a lower end having a depth that ranges from about 10 to about 60 millimeters measured perpendicular from a line extending between upper ends of the upper member crests.

10. The collar according to claim 9, wherein the jaw guide lower end depth ranges from about 15 to about 30 millimeters measured perpendicular from the line extending between upper ends of the upper member crests, and wherein a width of the jaw guide between jaw guide ends ranges from about 5 to about 20 centimeters.

11. The collar according to claim 10, wherein an uppermost portion of the upper member crests are located at the jaw guide first end and jaw guide second end.

12. The collar according to claim 10, wherein the body has a length that ranges from about 10 to about 50 centimeters, and wherein the body has a height that ranges from about 5 to about 25 centimeters.

13. The collar according to claim 12, wherein the jaw guide width ranges from about 10 to about 15 centimeters, wherein the body of the length is from about 20 to about 40 centimeters, and wherein the body height is from about 5 to about 17 centimeters.

14. The collar according to claim 8, wherein the connector member comprises a hook and loop fastening system, wherein a first fastener is present and is adhered to a first lateral end of the body, and wherein a second fastener is present and is connected through an aperture at a second lateral end of the body and has a portion extending outwardly from the body a distance.

15. A restraint collar for an animal, comprising:
a resilient, flexible body having an upper member adapted to be situated below a jaw of an animal in a region of an upper portion of a neck of the animal, the body having a lower member adapted to be situated in a region of a lower portion of the neck of animal, the body upper member including a jaw guide having a first end and second end and an archial portion therebetween extending downwardly a distance towards the lower member and adapted to be situated at a front central portion of the animal's neck, the body further including an upper member crest positioned laterally outward on each side of the jaw guide first end and second end and each adapted to fit below the jaw of the animal, wherein the body includes an ear guide located on the upper member located laterally outward from each upper member crest and adapted to be situated below the ear of the animal when the collar is in a connected position, and wherein each ear guide independently has an angled portion or an archial portion, wherein the collar is a reversible collar whereby the lower member is utilizable as a second upper member adapted to be situated below the jaw of the animal in the region of the upper portion of the neck of the animal and the upper member as a second lower member adapted to be situated in the region of the lower portion of the neck of the animal when the collar is in a reversed position and the upper member as a second lower member when the collar is on the animal in a reversed position, wherein the lower member includes a central jaw guide located between two lower member crests and having a portion extending upwardly between the crest toward the upper member, and wherein the lower member includes an ear guide located laterally outward from each lower member crest with the lower ear guide adapted to be situated below the ear of the animal when the collar is in the reversed, connected position, and wherein each lower member ear guide independently has an angled portion or an archial portion, wherein the lower member is formed as a mirror image of the upper member along a lateral line of the body, that extends through both lateral ends of the body.

* * * * *